United States Patent
Brown et al.

(10) Patent No.: US 9,115,864 B2
(45) Date of Patent: Aug. 25, 2015

(54) OPTICAL INTERFERENCE FILTERS, AND FILAMENT TUBES AND LAMPS PROVIDED THEREWITH

(71) Applicant: General Electric Company, Schenectady, NY (US)

(72) Inventors: Peter William Brown, Twinsburg, OH (US); Tianji Zhao, Highland Heights, OH (US); Benjamin James Ward, Beachwood, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 23 days.

(21) Appl. No.: 13/971,930

(22) Filed: Aug. 21, 2013

(65) Prior Publication Data
US 2015/0055346 A1   Feb. 26, 2015

(51) Int. Cl.
*F21V 9/04* (2006.01)
*G02B 5/28* (2006.01)
*H01K 1/32* (2006.01)

(52) U.S. Cl.
CPC . *F21V 9/04* (2013.01); *G02B 5/282* (2013.01); *H01K 1/32* (2013.01)

(58) Field of Classification Search
CPC .............. F21V 9/04; G02B 5/282; H01K 1/32
USPC ........................................................ 362/293
See application file for complete search history.

(56) References Cited

U.S. PATENT DOCUMENTS

| | | | |
|---|---|---|---|
| 4,229,066 A | 10/1980 | Rancourt | |
| 4,524,410 A | 6/1985 | Kawakatsu | |
| 4,588,923 A | 5/1986 | Hoegler | |
| 4,663,557 A | 5/1987 | Martin, Jr. | |
| 4,689,519 A | 8/1987 | Ooms | |
| 4,701,663 A | 10/1987 | Kawakatsu | |
| 4,734,614 A | 3/1988 | Kuus | |
| 4,896,928 A | 1/1990 | Perilloux | |
| 4,940,636 A | 7/1990 | Brock | |
| 4,949,005 A | 8/1990 | Parham | |
| 5,412,274 A | 5/1995 | Parham | |
| 5,422,534 A | 6/1995 | Dynys | |

(Continued)

FOREIGN PATENT DOCUMENTS

| | | |
|---|---|---|
| WO | 9953526 A1 | 10/1999 |
| WO | 2007010462 A2 | 1/2007 |

OTHER PUBLICATIONS

R.S. Roth and L.W. Coughanour, "Phase Equilibrium Relations in the System Titania-Niobia and Zirconia-Niobia", Journal of Research of the National Bureau of Standards, vol. 55, No. 4, Oct. 1955, pp. 209-213.

*Primary Examiner* — Nimeshkumar Patel
*Assistant Examiner* — Jacob R Stern
(74) *Attorney, Agent, or Firm* — GE Global Patent Operation; Peter T. DiMauro

(57) ABSTRACT

A multilayer coating systems suitable for use as optical interference filters in lighting systems, for example, halogen lamps. Such an optical interference filter contains alternating layers of a high refractive index material and a low refractive index material. The high refractive index material consists of niobia, titania, and incidental impurities and contains either about 25 to less than 50 mol % titania and the balance niobia and incidental impurities, or contains about 60 to about 80 mol % titania and the balance niobia and incidental impurities.

20 Claims, 1 Drawing Sheet

(56) References Cited

U.S. PATENT DOCUMENTS

| | | | |
|---|---|---|---|
| 5,569,970 A * | 10/1996 | Dynys et al. ................. 313/112 |
| 5,587,626 A | 12/1996 | Parham |
| 5,627,426 A | 5/1997 | Whitman |
| 5,676,579 A | 10/1997 | Parham |
| 5,688,608 A * | 11/1997 | Tsai et al. ................. 428/696 |
| 5,982,078 A | 11/1999 | Krisl |
| 6,462,465 B1 | 10/2002 | Israel |
| 2001/0020821 A1 | 9/2001 | Cottaar |
| 2008/0054774 A1 | 3/2008 | Ritz et al. |
| 2009/0190226 A1 | 7/2009 | Mehrtens et al. |

* cited by examiner

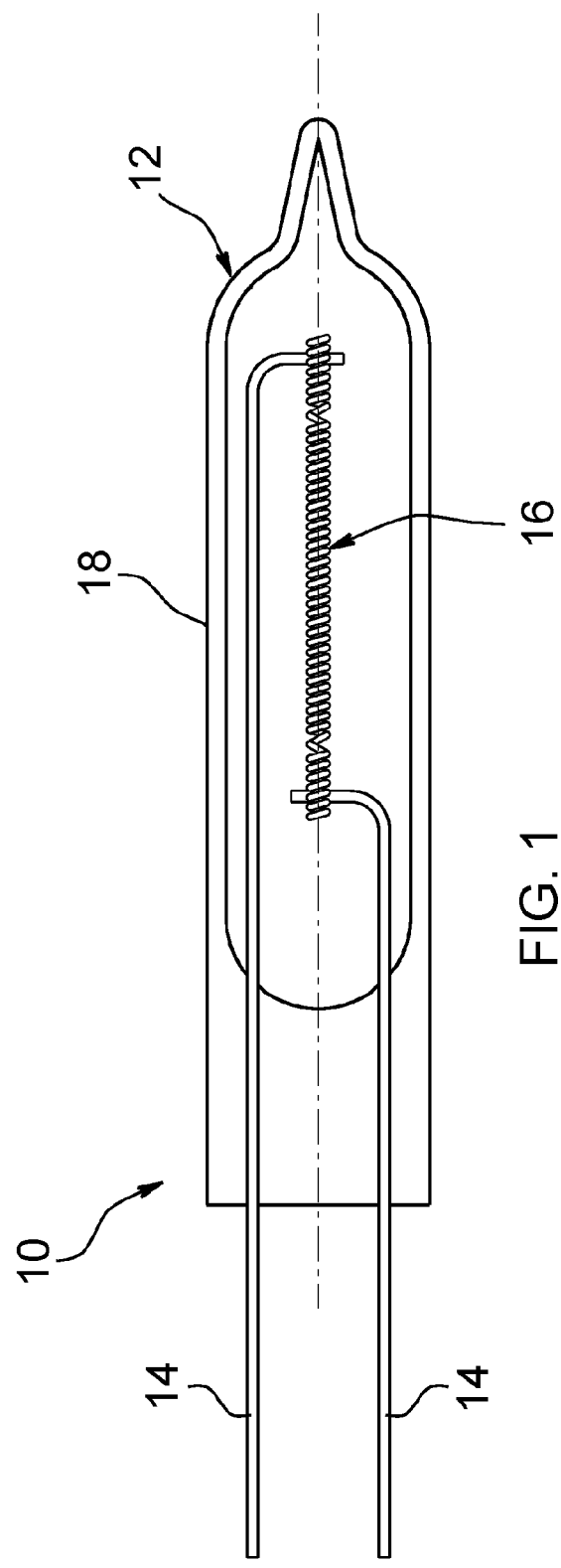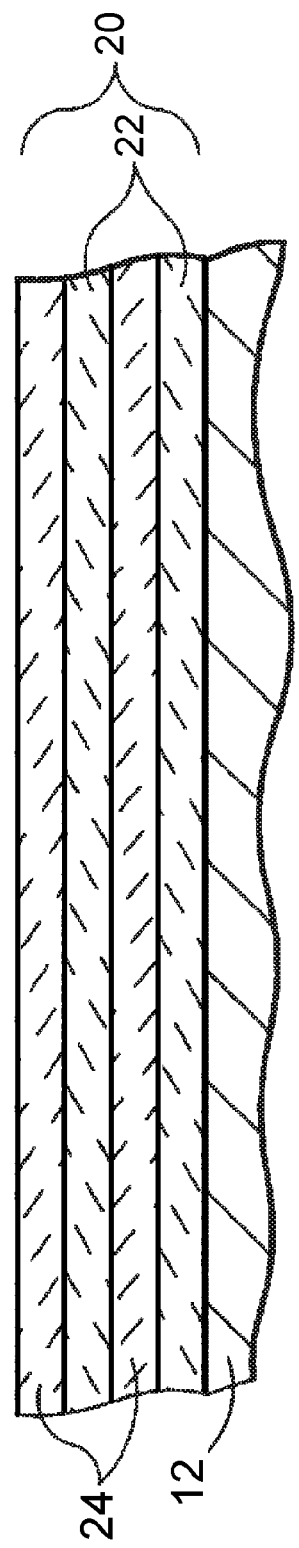

OPTICAL INTERFERENCE FILTERS, AND FILAMENT TUBES AND LAMPS PROVIDED THEREWITH

BACKGROUND OF THE INVENTION

The present invention generally relates to lighting systems and related technologies. More particularly, this invention relates to optical interference filters suitable for use with lighting systems, for example, halogen lamps.

Halogen filament tubes, also referred to as halogen IR (infrared) filament tubes (lamps), are often provided with a coating system on an outer surface of the tube for the purpose of spectrally reflecting IR radiation emitted by a filament within the tube. The coating system, referred to as an optical interference filter or more simply an interference filter, may reflect IR radiation back to the filament, where a portion of the reflected radiation can be absorbed to increase the efficacy of the filament tube, for example, by reducing the electrical power needed to operate the filament tube at a constant filament temperature. The interference filter is typically designed to transmit sufficient visible radiation to promote the lumen output and maintain the color of the light generated by the filament tube.

A nonlimiting example of a halogen filament tube 10 is represented in FIG. 1. The tube 10 includes an envelope (capsule) 12 formed of a light-transmissive material, nonlimiting examples of which are quartz (fused silica) or certain glass materials capable of withstanding high temperatures over extended periods of time. Two leads 14 enter the interior of the envelope 12 at one end of the tube 10, where they are electrically and mechanically attached to opposite ends of a filament 16 within the envelope 12. The filament 16 is typically composed of tungsten, carbon, or another electrically-conductive material. An optical interference filter 18 is indicated as being present as a coating on at least a portion of a surface of the envelope 12, typically the outer surface of the envelope 12.

As noted above, the filter 18 is intended to modify and/or enhance the energy efficiency of the filament tube 10. Suitable materials for the filter 18 typically exhibit the following characteristics: sufficient optical properties to be incorporated into a practical filter design; thermal stability at lamp operating temperatures (for example, 600° C. or higher) in an oxidizing or reducing environment in the envelope 12; chemical stability with the materials of the envelope 12 and other potential layers of the filter 18; and suitable thermal expansion properties in comparison to the materials of the envelope 12 and other potential layers of the filter 18. A known construction for the filter 18 is a multilayer coating system that includes alternating layers of relatively high and low refractive index materials that in combination promote the reflection of IR radiation (generally wavelengths of about 800-2500 nm) while transmitting visible radiation (generally wavelengths of about 400-750 nm). Various different coating compositions have been proposed, many utilizing silica ($SiO_2$) as the lower refractive index material. As the higher refractive index material, various oxide compositions have been proposed, including oxides of hafnium, niobium, tantalum, titanium, zirconium, vanadium, cerium, and compounds thereof, for example, titanium oxide (titania; $TiO_2$) alloyed (complexed) with oxides of zirconium, niobium, tantalum, etc. Two such examples are a high refractive index material containing about 90 mol % titania and about 10 mol % of a mixture of titania and niobia ($Nb_2O_5$) reported in U.S. Pat. No. 4,940,636, and a high refractive index material containing about 96-99 mol % titania and about 1-4 mol % niobia reported in WO 2007/0104462. In the binary phase diagram for the titania-niobia system, these levels generally provide for a titania solid solution containing a $TiO_2.Nb_2O_5$ phase. However, film compositions containing high levels (for example, about 95 mol %) of titania are susceptible to undergoing a phase transformation at the relatively high operating temperatures of a halogen filament tube, and such phase transformations may be catastrophic to an interference filter. Another example reported in U.S. Pat. No. 4,940,636 is a 1:1 molar ratio of titania and niobia that yielded a single stoichiometric phase, $TiO_2:Nb_2O_5$, also referred to as $Nb_2TiO_7$. Finally, WO 99/53526 reports a high refractive index material as containing 20-40 wt % niobia with the balance tantala ($Ta_2O_5$), which in molar percentage is about 29-53 mol % niobia. According to the teachings of WO 99/53526, films excessively high in niobia content are at risk of darkening over the life of a halogen lamp and that, to mitigate or abate film darkening, the filament tube may contain an oxidizing environment.

In view of the foregoing, there are limitations and disadvantages associated with existing materials used for optical interference filters of types that can be applied to halogen filament tubes, and there are ongoing efforts to develop improved interference filters for such high temperature applications.

BRIEF DESCRIPTION OF THE INVENTION

The present invention provides multilayer coating systems suitable for use as optical interference filters in lighting systems, for example, halogen lamps.

According to a first aspect of the invention, an optical interference filter comprises alternating layers of a high refractive index material and a low refractive index material. The high refractive index material consists of niobia, titania, and incidental impurities and contains either about 25 to less than 50 mol % titania and the balance niobia and incidental impurities, or contains about 60 to about 80 mol % titania and the balance niobia and incidental impurities.

Other aspects of the invention include halogen filament tubes comprising an optical interference filter having the composition described above, and halogen lamps equipped with halogen filament tubes comprising an optical interference filter having the composition described above.

A technical effect of the invention is the ability of the optical interference filter to be effective in transmitting visible light and reflecting infrared radiation, while avoiding shortcomings associated with prior art optical interference filters that contain a relatively high level of titania or a relatively high level of niobia.

Other aspects and advantages of this invention will be better appreciated from the following detailed description.

BRIEF DESCRIPTION OF THE DRAWINGS

FIG. 1 is a cross-sectional view representing a halogen filament tube of a type that can benefit from optical interference filters in accordance with embodiments of this invention.

FIG. 2 represents a cross-sectional view of a substrate region of an envelope of a filament tube of a type represented in FIG. 1.

DETAILED DESCRIPTION OF THE INVENTION

The invention will be discussed in reference to FIG. 1, which as previously described represents a halogen filament tube 10 of a type known in the art. The filament tube 10 is useful for describing various embodiments of the present invention, as it has found commercial use in various halogen bulb/lamp configurations, including but not limited to PAR (parabolic aluminized reflector) lamps and medium base A19 lamps. However, it should be appreciated that the invention is not limited to the tube configuration represented in FIG. 1 or any particular type of lamp, and instead is applicable to various other tube configurations and lamps that might benefit from the inclusion of optical reflective filters of the type described herein.

As known in the art, the filament tube 10 contains a halogen-containing species and may further contain a fill gas comprising an inert gas, for example, Kr, Xe, Ar, or any mixture thereof. Suitable halogen-containing species are known in the art, nonlimiting examples of which include $CH_3Br$, HBr, and mixtures thereof. As also known in the art, the filament 16 may comprise essentially any known filament material, for example, tungsten, tantalum, carbon, or mixture or composites thereof. FIG. 1 represents the filament 16 as having a coiled design, which promotes the re-absorption of infrared radiation reflected by an optical interference filter, generally indicated with reference number 18 in FIG. 1 and represented as a multilayer optical interference filter 20 in FIG. 2. However, other configurations of the filament 16 are foreseeable and within the scope of the invention.

FIG. 2 schematically represents a substrate region of the envelope (capsule) 12 of the filament tube 10 of FIG. 1, and represents a surface of the envelope 12 as provided with the above-noted multilayer optical interference filter 20. The filter 20 is represented as comprising four discrete layers, made up of alternating layers 22 and 24 of different compositions. However, it should be evident that FIG. 2 is drawn for purposes of clarity and simplicity, and therefore is not to scale nor intended to suggest that the optical interference filter 20 is limited to any particular number of layers or layers having any particular thicknesses. Furthermore, the filter 20 may further include layers in addition to the alternating layers 22 and 24, for example, of materials capable of promoting the transmittance or reflection of light.

The multi-layer optical interference filter 20 generally may be capable of withstanding exposure to high temperatures sustained by the envelope 12 as a result of radiation emitted by the filament 12. Such temperatures may exceed 600° C., at which significant thermal stresses can be induced within the filter 20 and with respect to the material of the envelope 12, for example, quartz or a glass material. Furthermore, for the purpose of providing a desired optical interference filtering effect, the alternating layers 22 and 24 comprise high and low refractive index materials. As used herein, the terms high refractive index and low refractive index are relative terms referring to the refractive index values of the materials that form the alternating layers 22 and 24. For purposes of this discussion, the material for the layers 24 may be deemed a low refractive index material on the basis that its refractive index value is lower than that of the material for the other layers 22. A notable but nonlimiting example of a low refractive index material is amorphous silica ($SiO_2$), which has a refractive index of about 1.49 at 550 nm. According to a preferred aspect of the invention, the high refractive index material of the remaining layers 22 comprises titania and niobia, and more preferably, aside from permissible levels of impurities, consists of titania ($TiO_2$) and niobia ($Nb_2O_5$) in specific relative amounts to achieve a desired titania-niobia complex. Titania has a refractive index of about 2.65 at 550 nm, and niobia has a refractive index of about 2.24 at 550 nm. As the high refractive index material, combinations of titania and niobia suitable for use in the layers 22 have an effective refractive index value that is greater than that of the material for the other layers 24.

According to preferred aspects of the invention, specific compositional ranges for the high refractive index material of the layers 22 include about 25 to less than 50 mol % titania and the balance niobia (and any incidental impurities), and about 60 to about 80 mol % titania and the balance niobia (and any incidental impurities). These embodiments of the invention preferably result in the presence of at least one of two titania-niobia complexes, namely, $TiO_2.Nb_2O_5$ and/or $TiO_2.3Nb_2O_5$, in the high refractive index layers 22. Furthermore, free niobia (i.e., uncomplexed with titania or in solid solution) is preferably not present in the layers 22, and therefore does not cause film darkening of concern in WO 99/53526, though it should be understood that certain embodiments could encompass the presence of free niobia. For the compositional range of about 25 to less than 50 mol % titania and the balance niobia (and any incidental impurities), a more preferred range for titania is believed to be 30 to 40 mol %, with the balance niobia and incidental impurities. For the compositional range of about 60 to about 80 mol % titania and the balance niobia (and any incidental impurities), a more preferred range for titania is believed to be 73 to 78 mol %, with the balance niobia and incidental impurities. These more preferred ranges are well within regions of the titania-niobia phase diagram containing, respectively, a 1:1 titania-niobia complex ($TiO_2.Nb_2O_5$) with a 1:3 titania-niobia complex ($TiO_2.3Nb_2O_5$) and/or a 1:1 titania-niobia complex ($TiO_2.Nb_2O_5$) with titania in solid solution. Notably, the titania content of each layer 22 is significantly lower than titania-niobia layers reported in aforementioned U.S. Pat. No. 4,940,636 (90 mol % titania) and WO 2007/0104462 (96-99 mol % titania), and also lower than a 1:1 molar ratio titania-niobia layer reported in U.S. Pat. No. 4,940,636. Furthermore, to avoid excessive film stresses and/or excessive film haze upon phase transformation, free titania is preferably not present in the layers 22, in other words, in preferred embodiments the layers 22 do not contain titania that is uncomplexed with niobia (for example, as $TiO_2.Nb_2O_5$ or as $TiO_2.3Nb_2O_5$) or in solid solution, though it should be understood that certain embodiments could encompass the presence of free titania. In addition to being a niobia-titania composition in contrast to the tantala-niobia composition disclosed in the aforementioned WO 99/53526, the 50 to 75 mol % range for niobia in the niobia-titania layers 22 significantly exceeds the 29-53 mol % range permitted for niobia in WO 99/53526.

According to preferred aspects of the present invention, the two sets of compositional ranges for the layers 22 are capable of exhibiting desirable optical dispersion characteristics in terms of visible radiation transmission and infrared radiation reflection targets when deposited on quartz and other potential substrate materials for the envelope 12. As a nonlimiting example, the combination of layers 22 and 24 of the filter 20 may substantially reflect light in the infrared portion of the spectrum, namely about 800 and 2500 nm, and substantially transmit light in the visible portion of the spectrum, namely, about 400-750 nm.

As previously noted, the multilayer optical interference filter 20 may comprise fewer or more layers 22 and 24 than represented in FIG. 2, as long as the layers 22 and 24 are appropriately paired with each other. In many applications, the filter 20 may comprise hundreds of the layers 22 and 24. The thickness of the entire filter 20 constituted by the layers 22 and 24 may vary, though in certain envisioned embodiments the filter 20 would have a total thickness of about 2 to about 10 micrometers, and more preferably about 4 to about 6.5 micrometers. The individual layers 22 and 24 of the filter 20 may be deposited by various known coating processes, and particularly deposition techniques suitable for the deposition of refractory metal oxide materials onto a quartz or glass substrate. For example, physical vapor deposition (PVD) and chemical vapor deposition (CVD) techniques can be used to deposit the filter 20, including PVD reactive sputtering, ion beam assisted deposition, PECVD, vacuum thermal evaporation, ion plating, sputtering, CVD, plasma CVD, LPCVD, and others known to those skilled in the art. The thickness of each individual layer 22 and 24 of the filter 20 may also vary, though in certain envisioned embodiments each layer 22 and 24 has a thickness of about 10 to about 400 nanometers, and more preferably about 30 to about 250 nanometers.

In preferred embodiments of the invention, the interference filter 20, its individual layers 22 and 24, and the substrate on which it is deposited (envelope 12) do not visibly, structurally, or functionally degrade due to tensile or compressive stresses induced at high exposure temperatures, for example, 700° C., over prolonged periods. In experimental investigations leading to the present invention, films containing approximately 30 to less than 50 mol % titania and the balance % niobia or approximately 60 to 80 mol % titania and the balance % niobia were deposited on quartz envelopes. The specific chemistries were 48.41 mol % titania with the balance niobia, 44.81 mol % titania with the balance niobia, 30.10 mol % titania with the balance niobia, 62.28 mol % titania with the balance niobia, and 73.3 mol % titania with the balance niobia. Multilayer optical interference filters were deposited on the substrates in which the aforementioned titania-niobia compositions served as high refractive index layers in combination with layers of silica as the low refractive index material. The coated halogen envelopes were subsequently heat treated in air at temperatures exceeding 700° C. with no negative impact on the filter films. In particular, no excessive film stresses, darkening, haze, or peeling was observed as a result of the thermal treatment. The coated halogen envelopes were flame-sealed to contain a low oxygen (less than 0.2 vol % $O_2$) fill gas, and then assembled into PAR38 lamps. Initial photometry indicated satisfactory performance, with no film darkening. These lamps were operated and periodically measured and evaluated for film darkening. No excessive film stresses, darkening, haze, or peeling was observed through 1500 hours of continuous operation.

While the invention has been described in terms of specific embodiments, it is apparent that other forms could be adopted by one skilled in the art. Therefore, the scope of the invention is to be limited only by the following claims.

The invention claimed is:

1. An optical interference filter comprising alternating layers of a high refractive index material and a low refractive index material, the high refractive index material consisting of niobia, titania, and incidental impurities, the high refractive index material containing either about 25 to less than 50 mol % titania and the balance niobia and incidental impurities, or containing about 60 to about 80 mol % titania and the balance niobia and incidental impurities, the high refractive index material comprising at least one of a 1:1 titania-niobia complex of $TiO_2.Nb_2O_5$ and a 1:3 titania-niobia complex of $TiO_2.3Nb_2O_5$.

2. The optical interference filter according to claim 1, wherein the high refractive index material contains about 25 to less than 50 mol % titania and the balance niobia and incidental impurities, and the high refractive index material comprises the 1:1 titania-niobia complex of $TiO_2.Nb_2O_5$ and the 1:3 titania-niobia complex of $TiO_2.3Nb_2O_5$.

3. The optical interference filter according to claim 1, wherein the high refractive index material contains 30 to 40 mol % titania, and the balance niobia and incidental impurities.

4. The optical interference filter according to claim 1, wherein the high refractive index material contains about 60 to about 80 mol % titania and the balance niobia and incidental impurities, and the high refractive index material comprises the 1:1 titania-niobia complex of $TiO_2.Nb_2O_5$.

5. The optical interference filter according to claim 1, wherein the high refractive index material contains 73 to 78 mol % titania, and the balance niobia and incidental impurities.

6. The optical interference filter according to claim 1, wherein the low refractive index material contains silica.

7. The optical interference filter according to claim 1, wherein the optical interference filter consists of the alternating layers of the high and low refractive index materials.

8. A filament tube comprising a light-transmissive envelope, a filament adapted as a light source within the envelope, and an optical interference filter comprising a multilayer coating on a surface of the envelope, the optical interference filter transmitting visible light and reflecting infrared radiation back to the filament, the optical interference filter comprising alternating layers of a high refractive index material and a low refractive index material, the high refractive index material consisting of niobia, titania, and incidental impurities, the high refractive index material containing either about 25 to less than 50 mol % titania and the balance niobia and incidental impurities, or containing about 60 to about 80 mol % titania and the balance niobia and incidental impurities, the high refractive index material comprising at least one of a 1:1 titania-niobia complex of $TiO_2.Nb_2O_5$ and a 1:3 titania-niobia complex of $TiO_2.3Nb_2O_5$.

9. The filament tube according to claim 8, wherein the high refractive index material contains about 25 to less than 50 mol % titania and the balance niobia and incidental impurities, and the high refractive index material comprises the 1:1 titania-niobia complex of $TiO_2.Nb_2O_5$ and the 1:3 titania-niobia complex of $TiO_2.3Nb_2O_5$.

10. The filament tube according to claim 8, wherein the high refractive index material contains 30 to 40 mol % titania, and the balance niobia and incidental impurities.

11. The filament tube according to claim 8, wherein the high refractive index material contains about 60 to about 80 mol % titania and the balance niobia and incidental impurities, and the high refractive index material comprises the 1:1 titania-niobia complex of $TiO_2.Nb_2O_5$.

12. The filament tube according to claim 8, wherein the high refractive index material contains 73 to 78 mol % titania, and the balance niobia and incidental impurities.

13. The filament tube according to claim 8, wherein the low refractive index material contains silica.

14. The filament tube according to claim 8, wherein the optical interference filter consists of the alternating layers of the high and low refractive index materials.

15. A halogen lamp having a filament tube comprising a light-transmissive envelope, a filament adapted as a light source within the envelope, and an optical interference filter comprising a multilayer coating on a surface of the envelope, the optical interference filter transmitting visible light and reflecting infrared radiation back to the filament for re-absorption, the optical interference filter comprising alternating layers of a high refractive index material and a low refractive index material, the high refractive index material consisting of niobia, titania, and incidental impurities, the high refractive index material containing either about 25 to less than 50 mol % titania and the balance niobia and incidental impurities, or containing about 60 to about 80 mol % titania and the balance niobia and incidental impurities, the high refractive index material comprising at least one of a 1:1 titania-niobia complex of $TiO_2.Nb_2O_5$ and a 1:3 titania-niobia complex of $TiO_2.3Nb_2O_5$.

16. The halogen lamp according to claim 15, wherein the high refractive index material contains about 25 to less than 50 mol % titania and the balance niobia and incidental impurities, and the high refractive index material comprises the 1:1 titania-niobia complex of $TiO_2.Nb_2O_5$ and the 1:3 titania-niobia complex of $TiO_2.3Nb_2O_5$.

17. The halogen lamp according to claim 15, wherein the high refractive index material contains 30 to 40 mol % titania, and the balance niobia and incidental impurities.

18. The halogen lamp according to claim 15, wherein the high refractive index material contains about 60 to about 80 mol % titania and the balance niobia and incidental impurities, and the high refractive index material comprises the 1:1 titania-niobia complex of $TiO_2.Nb_2O_5$.

19. The halogen lamp according to claim 15, wherein the high refractive index material contains 73 to 78 mol % titania, and the balance niobia and incidental impurities.

20. The halogen lamp according to claim 15, wherein the optical interference filter consists of the alternating layers of the high and low refractive index materials.

* * * * *